(No Model.)
R. WHITE.
SPINNING SPINDLE AND ITS SUPPORT.
No. 442,655. Patented Dec. 16, 1890.
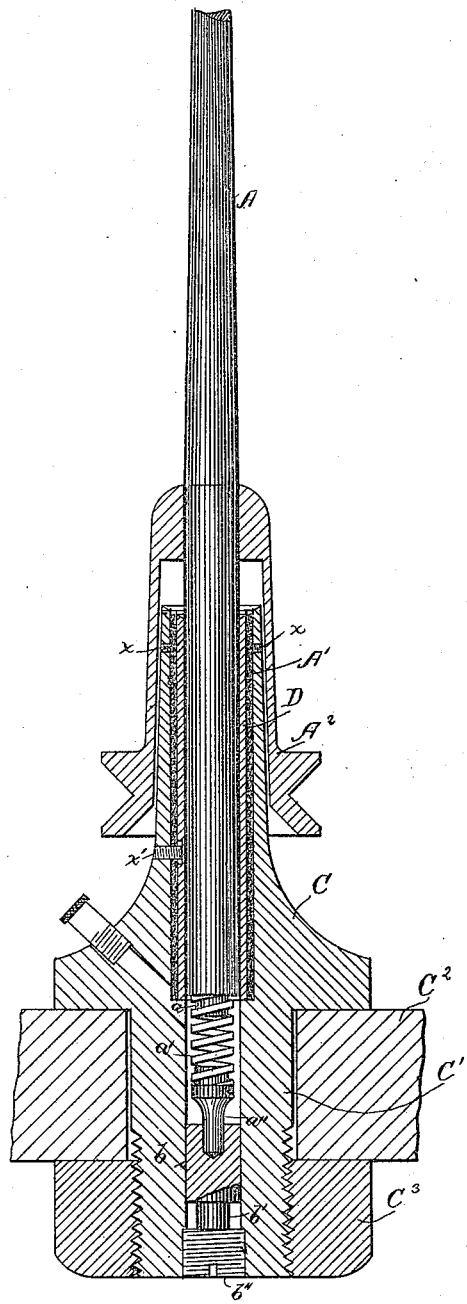
Witnesses
Hirkley Hyde.
Fred A Burbeck
Inventor
Rollin White
By His Attorney
Herbert R. White

UNITED STATES PATENT OFFICE.

ROLLIN WHITE, OF LOWELL, ASSIGNOR TO WILLIAM F. DRAPER, OF HOPEDALE, MASSACHUSETTS.

SPINNING-SPINDLE AND ITS SUPPORT.

SPECIFICATION forming part of Letters Patent No. 442,655, dated December 16, 1890.

Application filed April 6, 1888. Serial No. 269,866. (No model.)

*To all whom it may concern:*

Be it known that I, ROLLIN WHITE, a citizen of the United States, residing at Lowell, in the county of Middlesex and Commonwealth of Massachusetts, have invented a certain new and useful Improvement in Spinning-Spindles and their Supports, of which the following is a specification.

My invention relates to an improvement in spindles; and it consists of a device whereby the spindle is allowed to have a lateral and longitudinal movement for the purpose of adjusting itself to the changing center of gravity caused by the variations of the cop or bobbin.

In this my invention I have combined with the supporting-case the bolster-bearing, the step and spindle, a stud or point, and a connected spring, the said point and spring being interposed between the body of the spindle and the step which supports the weight of the spindle in such manner as to permit the body of the spindle to move laterally, as well as vertically, in order that the spindle may adapt itself to changing conditions of the load carried by it.

The drawing in section represents a rail, a supporting-case, a nut and step, and a sleeve-whirl in section, the spindle and the point and spring referred to being in elevation. The spindle A has a sleeve-whirl $A^2$, of usual construction. The supporting-case C has a threaded shank $C'$, which is extended through a hole in the usual rail $C^2$, below which rail the said shank has applied to it a nut $C^3$ to confine the supporting-case in place, the hole in the rail being preferably somewhat larger in diameter than the shank of the case to permit the latter to be adjusted more or less to place the spindle central with relation to the usual ring. (Not shown.) The lower end of the supporting-case is represented as provided with the screw plug or case $b''$, on which rests the step $b$, which supports the weight of the spindle and the load carried by it. The supporting-case referred to has a bolster bearing or surface represented as an independent sleeve or tube D, loosely mounted within it, the said bolster-bearing being represented as surrounded by a yielding packing $A'$, the rotation of the said bolster-bearing being restrained by a pin or projection $x'$, which engages a slot or projection thereof. The lower end of the bolster-bearing is represented as resting upon a shoulder in the supporting-case. I have interposed between the spindle and step referred to a pointed stud $a''$ and a spring $a'$, the said stud and spring being connected together and the spring being attached to the spindle, both the spring and stud being interposed between the spindle and step in such manner that the spindle is free to rotate, the said stud serving as a center of rotation, while the said spring, besides letting the spindle move laterally, also supports the weight of the spindle and its load in such manner that the spindle may yield somewhat vertically. The spring $a'$ is connected to the spindle A and the stud $a''$ is attached to the lower end of the spring, both rotating in unison with the body of the spindle.

I am aware that a spindle and a pin or foot have been connected by a flexible strip of metal; but prior to my invention I am unaware that a spring capable of yielding vertically or in the direction of its length and a stud to define the center of rotation of a spindle have ever been connected and interposed, as represented, between a spinning-spindle and a step.

I claim—

1. The supporting-case, a laterally-movable bolster or lateral bearing-surface therein, a step, and a spindle, combined with a stud and a spiral spring interposed between the said step and spindle and having a construction substantially as described, to provide for both lateral and longitudinal movement of the spindle under varying conditions of yarn-load, substantially as set forth.

2. The supporting-case having a step, combined with a spindle and a pointed stud $a''$, and a spring interposed between and connected with both the spindle and stud, substantially as set forth.

3. The supporting-case, its step, and the loose bolster, combined with a spindle and a pointed stud $a''$, and a spring interposed between and connected with both the spindle and stud, substantially as set forth.

ROLLIN WHITE.

Witnesses:
H. R. WHITE,
C. L. WHITE.